P. REITHER.
BALING TIE.
APPLICATION FILED JULY 24, 1909.

961,258.

Patented June 14, 1910.
3 SHEETS—SHEET 1.

WITNESSES
M. Walstrom
J. H. Byington

INVENTOR
PETER REITHER
BY Paul & Paul
ATTORNEYS

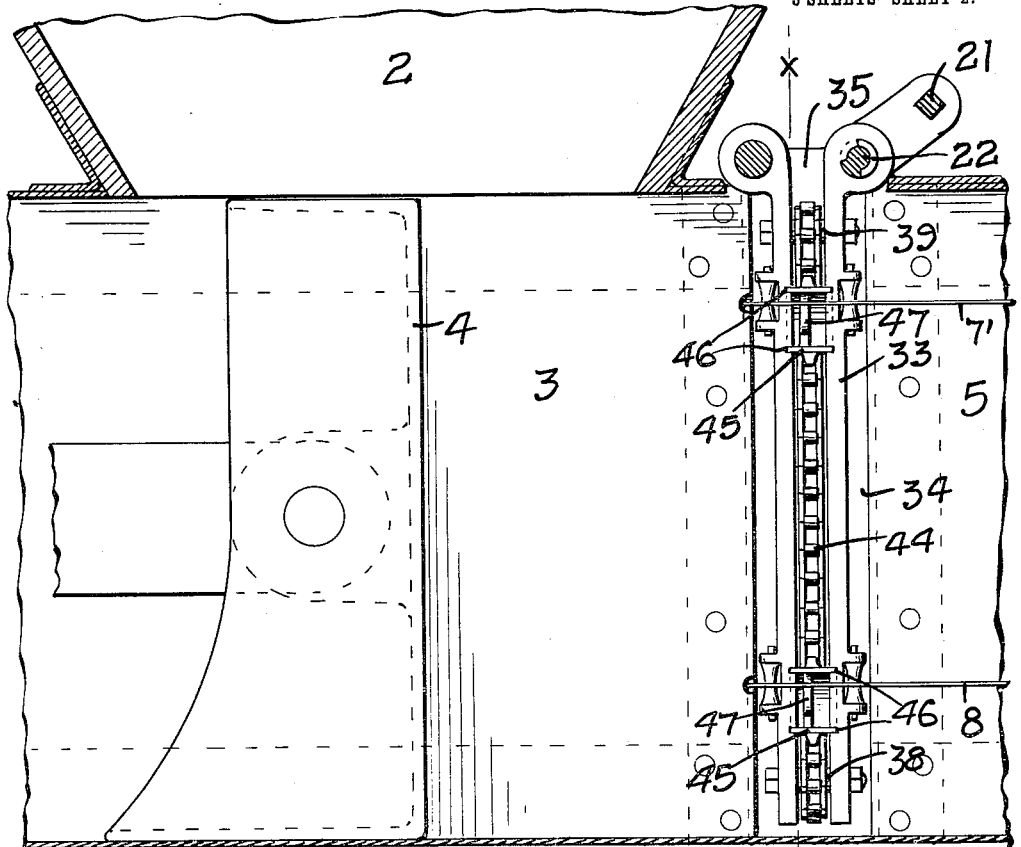
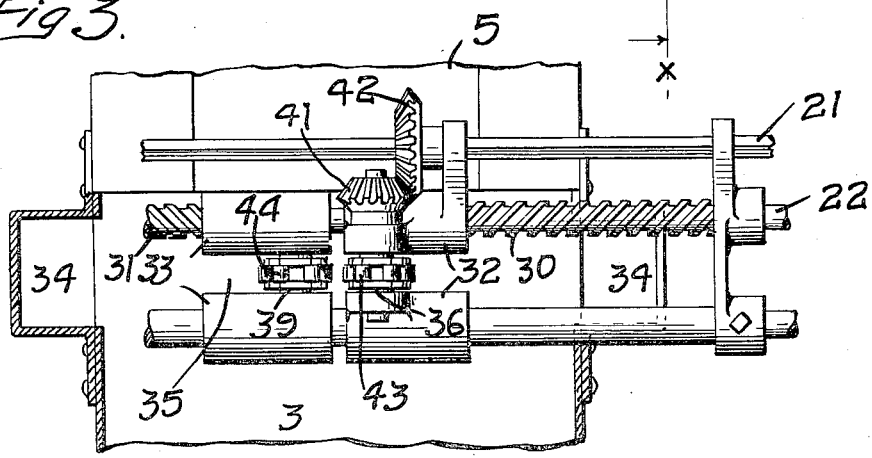

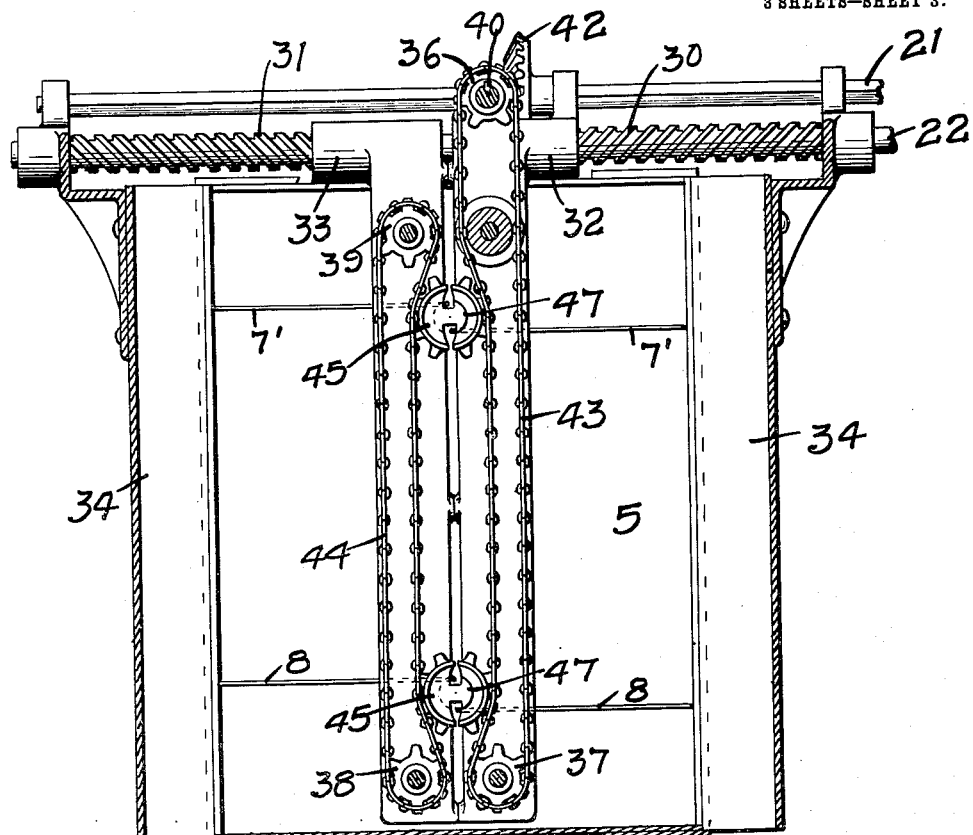
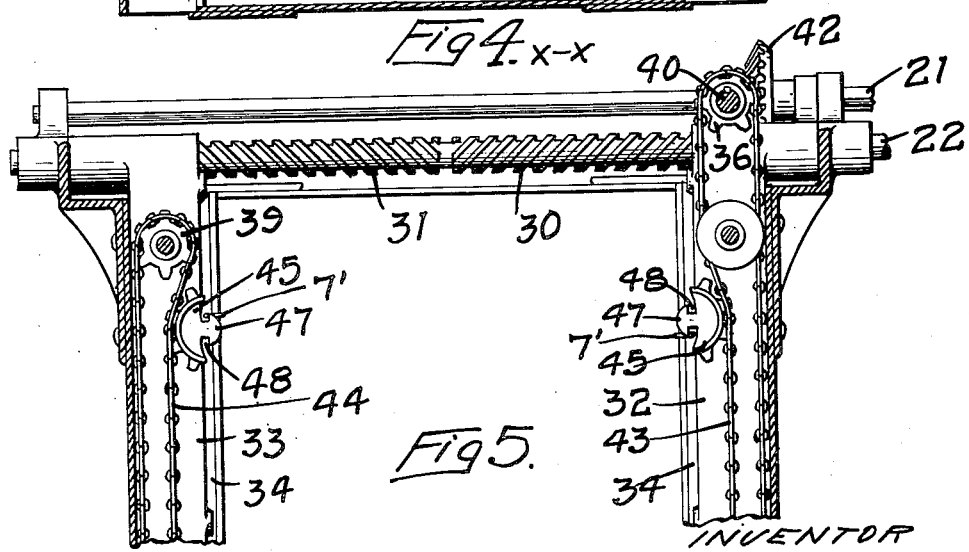

UNITED STATES PATENT OFFICE.

PETER REITHER, OF BENNETTVILLE, MINNESOTA.

BALING-TIE.

961,258.

Specification of Letters Patent.   Patented June 14, 1910.

Application filed July 24, 1909.   Serial No. 509,407.

*To all whom it may concern:*

Be it known that I, PETER REITHER, of Bennettville, Aitkin county, Minnesota, have invented certain new and useful Improvements in Baling-Ties, of which the following is a specification.

My invention relates to attachments for baling presses and the object of the invention is to provide improved means for twisting and cutting the wires after they are wrapped around the bale in the baling chamber.

My invention consists generally in various constructions and combinations, all as hereinafter described and particularly pointed out in the claims.

Figure 1:
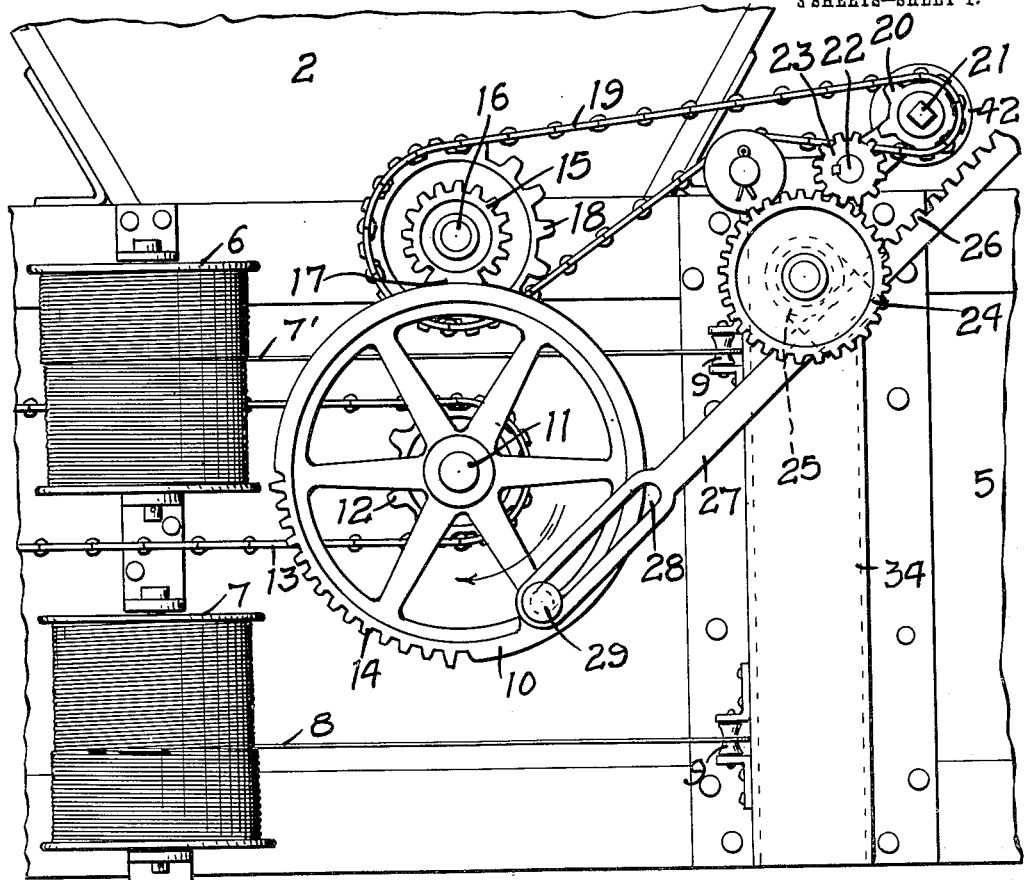
Figure 2:
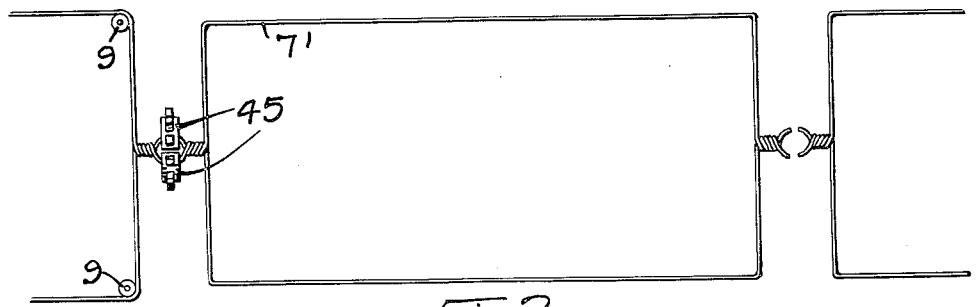

In the accompanying drawings, forming part of this specification, Figure 1 is a side elevation of a portion of a baling press embodying my invention, Fig. 2 is a diagrammatic view, illustrating the manner of putting the wires around the bale, Fig. 3 is a detail sectional view, illustrating a portion of the hopper, the baling plunger and the entrance to the baling chamber, Fig. 4 is a sectional view on the line x—x of Fig. 3, Fig. 5 is a detail sectional view, illustrating the mechanism by means of which the wire is twisted and cut, Fig. 6 is a top view of the mechanism shown in Fig. 5.

In the drawing, 2 represents a hopper, communicating with the chamber 3, wherein a plunger 4 is arranged.

5 represents the baling chamber and 6 and 7 are reels carrying wires 7′ and 8, which pass around pulleys 9 through the baling chamber to corresponding reels on the other side of the press. There may be any suitable number of these wires, according to the character of the material that is being baled and the number of binding wires necessary.

10 is a wheel mounted on a shaft 11 having a sprocket wheel 12 driven by a sprocket chain 13, that is tripped and driven by any suitable mechanism, which I have not thought necessary to illustrate herein. The wheel 10 has a mutilated gear 14 arranged to mesh with the teeth of a pinion 15 mounted on a shaft 16 and said pinion has a surface 17 that is adapted to bear on the periphery of the wheel 10 and lock it against premature movement. A sprocket wheel 18 is mounted on the shaft 16 and connected by a sprocket chain 19 with a sprocket wheel 20, secured on a shaft 21 that is square in cross section. A shaft 22 is provided near the shaft 21 and has a pinion 23 meshing with the gear 24. This gear has a pinion 25, meshing with the teeth 26 of a bar 27, which has a slot 28 at one end to receive a pin 29 on the wheel 10, said bar being freely slidable on said pin to render the device inoperative at a predetermined period in the revolution of the wheel. The shaft 22 has right and left hand threads 30 and 31 thereon and hangers 32 and 33 are carried by said right and left hand threads and are movable thereover to and from one another in the operation of the machine. These hangers depend across the baling chamber and recesses 34 are formed in the side walls of the chamber to receive the hangers and allow them to be moved out of the baling chamber and out of the path of the bale and the plunger. The baling wires pass around these hangers and vertical recesses 35 are formed in the hangers, in which sprocket wheels 36, 37, 38 and 39 are mounted. The hubs of the hangers are interiorly threaded and move back and forth on the threads 30 and 31, as the shaft 22 is revolved, and the shaft 40, on which the sprocket 36 is mounted, has a beveled pinion 41 meshing with a gear 42 that is slidable on the squared shaft 21. A sprocket chain 43 connects the sprockets 36 and 37 and a similar chain 44 connects the sprockets 38 and 39.

Within the recess 35 of each hanger segmental sprockets 45 are provided, having their hubs fitting within recesses 46 in said hangers and held thereby, but permitted to turn freely through the engagement of the sprocket chains 43 and 44 therewith. These segmental sprockets have prongs 47 projecting therefrom toward the baling chamber and provided with notches 48 to receive the baling wires extending through said chamber, as shown in Fig. 5. These notches have cutting edges, those of the opposite sections coöperating with one another to cut the wires. The normal position of the hangers is illustrated in Fig. 5, in which there is shown the recesses on each side of the baling chamber, the operating mechanism being in the position illustrated in Fig. 1.

Upon the starting of the wheel 10, which will take place at a predetermined point in the operation of the machine or when the bale is ready for binding, the bar 27 will be moved lengthwise, actuating the screw shaft and moving the hangers to an operative position in the middle of the baling chamber, as indicated in Fig. 4. The wires extending around the bale will at this time be in the notches formed in the prongs 47, which notches, as previously described, have cutting edges, and the movement of the hangers to the middle of the baling chamber will bring the segmental sprockets together with one wire in the notch above the center of the wheel and the other in the notch below the center. When the hangers have been brought together, the teeth 14 of the wheel 10 will be in position to engage the gear 15 and thereupon the squared shaft 21 will be revolved to drive the chain belts 43 and 44 and the movement of these belts will impart a revolving movement to the segmental sprockets and twist the wires and at a predetermined point in the movement of these segmental sprockets, the cutting edges of prongs 47 will engage the wires and sever them, as indicated in the diagrammatic view in Fig. 2. The bale will then be firmly bound and may be pushed out of the baling chamber in the usual way. During the twisting of the wires, the screw shaft will remain stationary, the pin 29 traveling in the slot 28 and when the twisting operation is completed, the bar 27 will be pushed in the other direction, reversing the movement of the screw shaft and separating the hangers, cutting the wires and returning the hangers to their normal position in the recesses 34. The operation described may then be repeated. This wire twisting and cutting feature of my invention I regard as of great importance and do not wish to confine its use to a baling press, as it is capable of performing its functions wherever a means for twisting and cutting wires is required.

I claim as my invention:—

1. The combination, with a baling press, of hangers mounted thereon and movable toward and from one another transversely with respect to the baling chamber, segmental sprocket wheels carried by said hangers and having prongs and notches therein to receive the baling wires, the opposite segmental sprockets uniting to form complete sprocket wheels when the hangers are moved together, and means for revolving said sprockets to twist the wires and cut them.

2. The combination, with a baling press, of a shaft having right and left hand threads thereon arranged transversely of the baling chambers, hangers mounted on said shaft and adapted to travel toward and from one another on said threads, segmental sprockets mounted on said hangers and capable of revolving therein and having notches to receive the baling wires, the opposite sprocket sections when moved together forming complete sprocket wheels, and means for revolving said wheels in said hangers to twist and cut the wires.

3. The combination, with a baling press having recesses in its side walls, of hangers fitting within said recesses, means for moving said hangers toward and from one another, segmental sprocket wheels carried by said hangers and having notches adapted to receive the binding wires, said segmental sprockets being adapted to grip and twist the wires to draw them around the bale and having means for severing the wires when the twisting operation is completed, and means for operating said hangers and said segmental sprockets at a predetermined point in the operation of the machine.

4. The combination, with a baling press, of hangers mounted thereon and movable transversely with respect to the baling chamber, segmental sprocket wheels mounted in said hangers and capable of revolving therein, said sprocket wheels having prongs thereon which are adapted to lap by one another when said hangers are moved into coöperating relation with one another, and said prongs having notches to receive the binding wires, and means for revolving said sprocket wheels to twist the wires and draw them around the bale, substantially as described.

5. The combination, with a baling press, of hangers supported thereon and arranged to move transversely with respect to the baling chamber, means for moving said hangers toward and from one another, wire twisting means mounted on said hangers and adapted to receive the binding wires, and means operated at predetermined intervals for actuating said wire twisting means, substantially as described.

6. The combination, with a baling press, of hangers supported thereon and arranged to move transversely with respect to the baling chamber, wire twisting means carried by said hangers and having a revolving movement therein and adapted to receive the binding wires, said wire-twisting means having wire-severing cutting edges, means for revolving said wire twisting means to successively twist the wires and sever them.

7. A wire twisting and cutting device comprising segmental sprocket wheels and supports therefor, said wheels having notches provided with cutting edges to receive the wires, the opposite segmental sprockets uniting to form complete sprocket wheels when the segments are brought together, and means for revolving said sprockets to twist the wires and cut them.

8. A wire twisting and cutting mechanism comprising oppositely arranged segmental wheels having notches provided with cutting edges to receive the wires, means for moving said segments into coöperating relation with one another and form complete wheels when the segments are brought together and means for revolving said wheels to twist the wires together and sever them.

9. The combination, with a frame, of a wire twisting means carried thereby and provided with prongs having notches therein, said notches having cutting edges and adapted to receive wires to be twisted together, means for moving said prongs into coöperating relation with one another and means for revolving said wire twisting means to successively twist the wires and sever them.

In witness whereof, I have hereunto set my hand this 10th day of July 1909.

PETER REITHER.

Witnesses:
J. M. SULLIVAN,
J. A. BYINGTON.